March 1, 1938.                    H. R. MINOR                    2,109,676
                         METHOD FOR MAKING SPONGE RUBBER
                              Filed Jan. 17, 1936           3 Sheets-Sheet 2
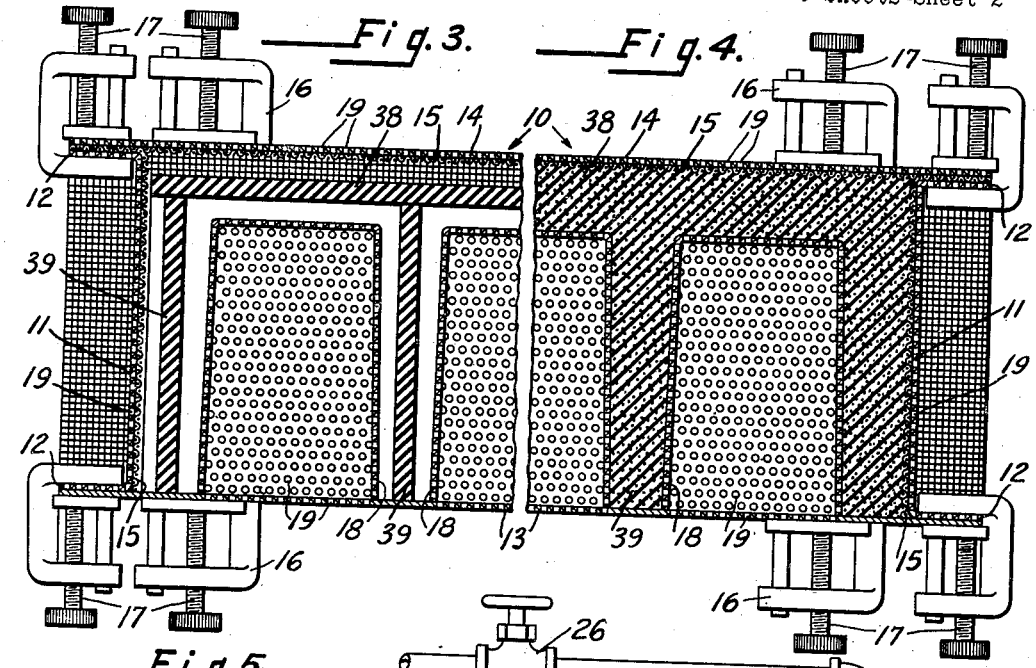
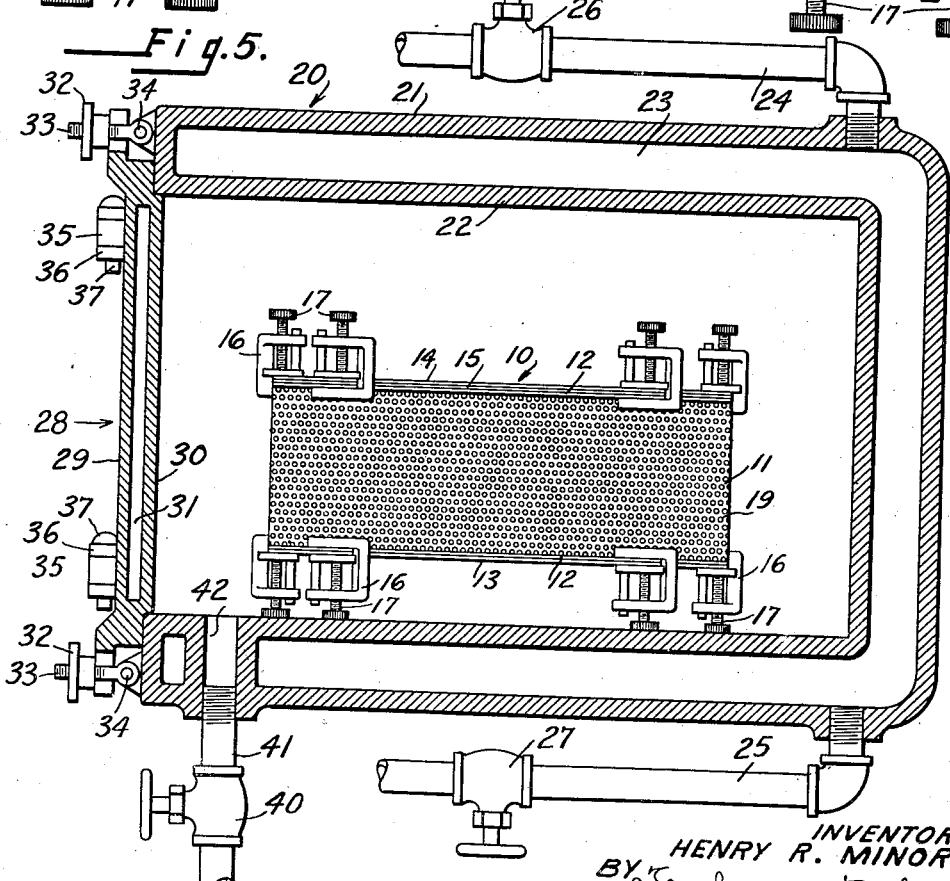
INVENTOR
HENRY R. MINOR.
BY Toulmin & Toulmin
ATTORNEYS

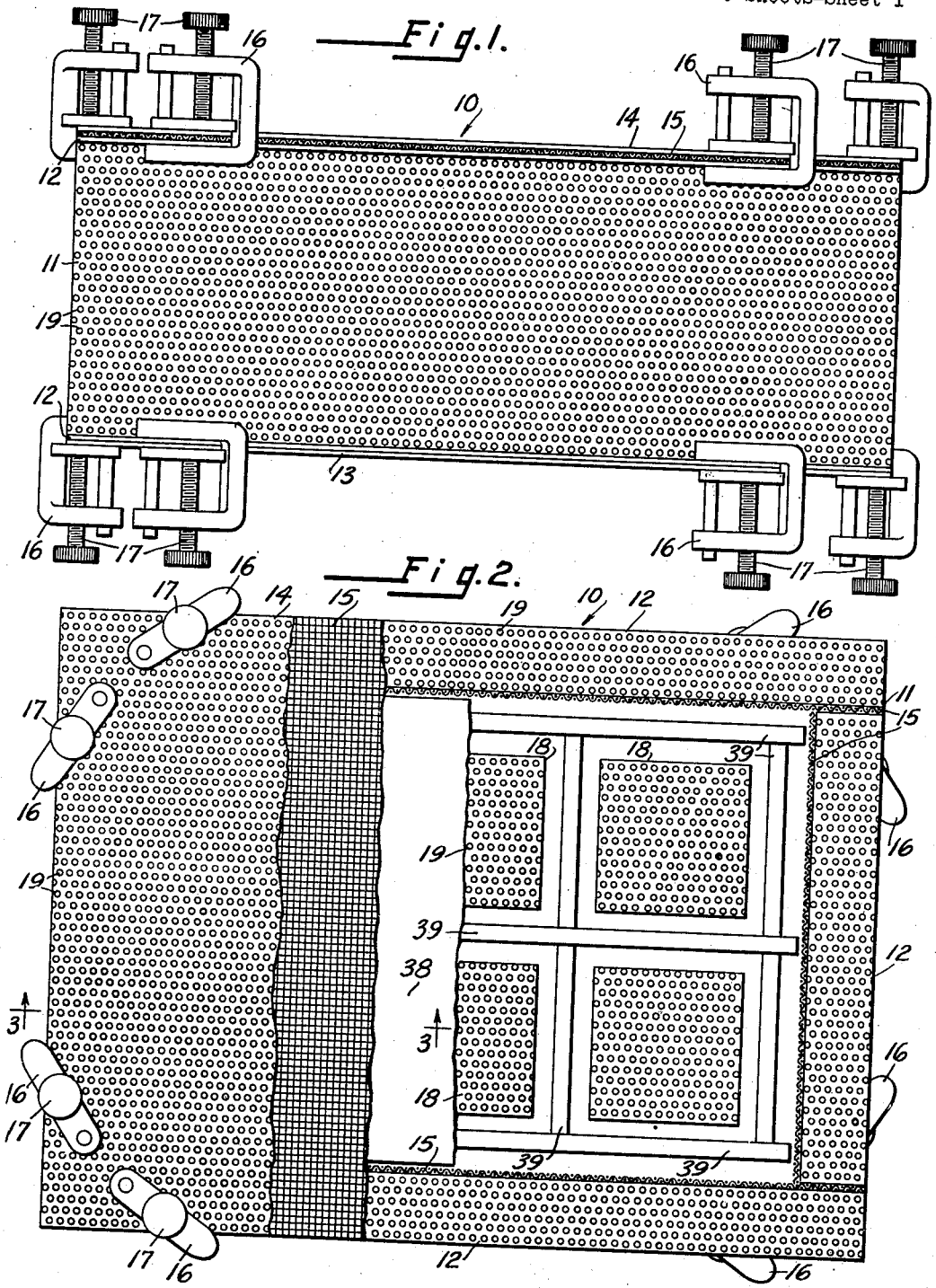

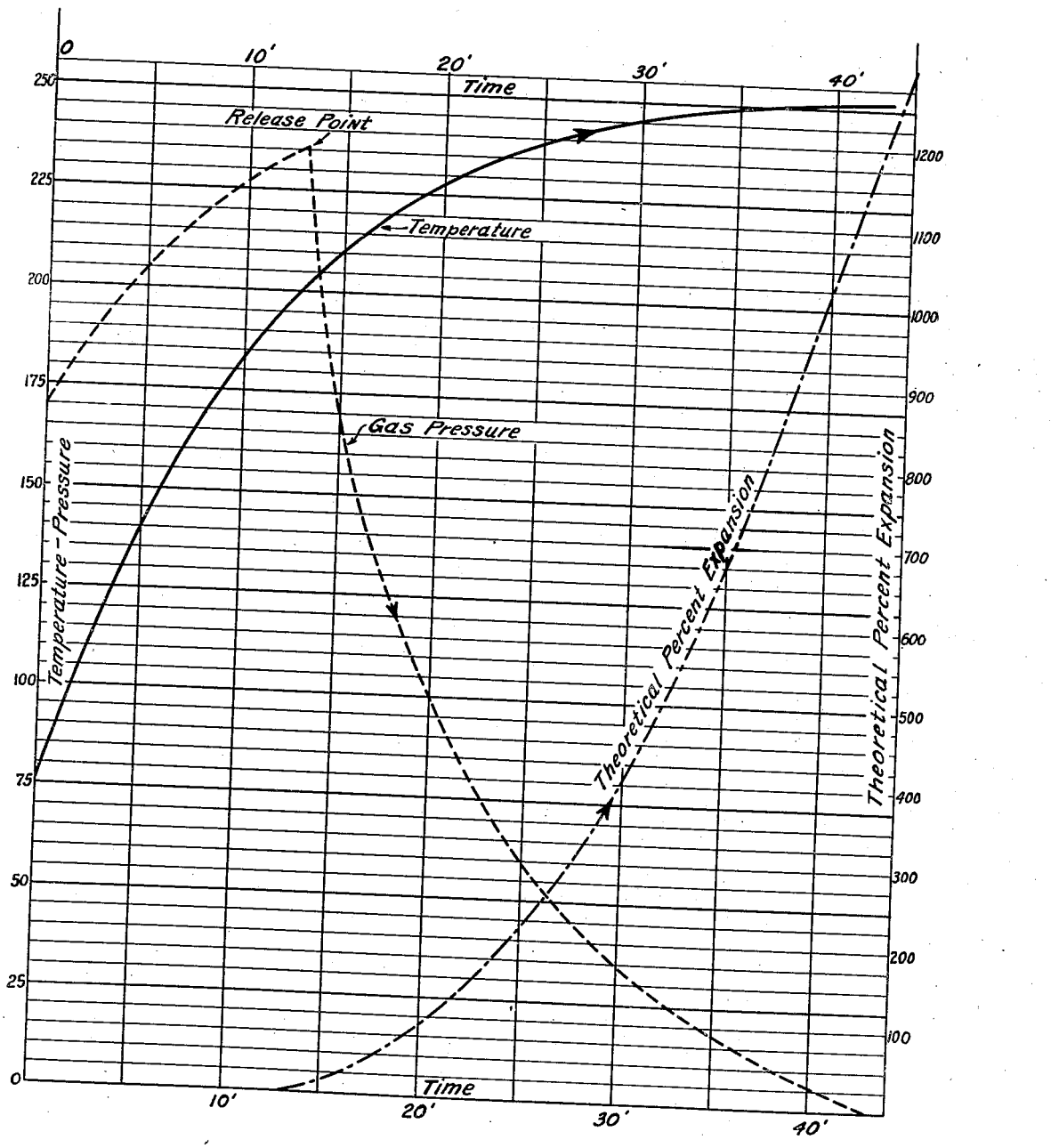

Patented Mar. 1, 1938

2,109,676

UNITED STATES PATENT OFFICE 2,109,676

METHOD FOR MAKING SPONGE RUBBER

Henry R. Minor, Dayton, Ohio, assignor to Industrial Process Corporation, Dayton, Ohio, a corporation of New York Application January 17, 1936, Serial No. 59,625

4 Claims. (Cl. 18—53)

This invention relates to rubber manufacture, and in particular, to methods for producing or treating sponge rubber.

One object of this invention is to provide a process of manufacturing sponge rubber by impregnating the rubber batch with carbon dioxide under high pressure prior to vulcanization, this vulcanization being preferably carried out in an autoclave, either simultaneously with the impregnation by the carbon dioxide or in successive steps.

Another object is to provide a process of manufacturing sponge rubber wherein the uncured rubber batch is exposed simultaneously to high pressure carbon dioxide gas and to heat, the temperature being caused to rise and the pressure to subside in a predetermined manner.

Another object is to provide a process of manufacturing sponge rubber wherein the rubber batch is exposed to high pressure carbon dioxide gas accompanied by a rise in temperature, after which the gas pressure is removed and the pressure around the batch reduced to a subatmospheric pressure by creating a partial vacuum thereround.

Another object is to provide a process for manufacturing sponge rubber wherein a rubber batch containing a "blowing agent" or gas generating substance, like sodium bicarbonate, is subjected, before curing, to the action of a high pressure inert gas, such as carbon dioxide, to impregnate the batch with the gas, and is afterward heated, under reduced pressure, so as to permit the batch to expand not only under the influence of the high pressure gas entrapped in the batch, but also under the influence of the gas generated within the batch by the gas generating substance, giving as a result a super-expanded sponge rubber.

Another object is to provide a mold for the manufacture of sponge rubber articles, this mold having perforated walls adapted to permit the entrance of high pressure gases used for impregnating the rubber batch to enable the batch to be subsequently expanded into sponge rubber; this mold being optionally lined with a foraminous or textile liner to permit the entrance and exit of the gas, yet retard the passage of rubber therethrough.

Another object is to provide simple means whereby the formation in the mold and size of cell structure are under control. This object is accomplished by application of heat subsequent to the impregnation period, but prior to the release of the gas pressure such that the rubber stock attains a certain degree of plasticity without sufficient heat to cause a set-up of the low temperature accelerators during the period that the heat is applied. It has been found that if sufficient heat is applied to soften this stock, but not enough to cause the included gas to expand substantially, if release of the gas pressure is then started a uniform fine cell structure is obtained, and the expansion or blowing is preferably in a vertical direction, which is much to be desired. If the heat is still further maintained in amount sufficient to expand the included gas, then the cell structure will be substantially larger and of a reticular nature. It should be noted that if the release of the gas pressure is started prior to the attainment of the proper plastic state, then the blowing or expansion tends to be in a horizontal rather than a vertical direction, resulting in folding and poor formation.

Another object of this invention is to provide a process whereby the uncured stock may be expanded or blown under commercial conditions to from 450 to 600 per cent. expansion, or from 25 to 50 per cent. greater expansion than is possible or customary with chemical sponge. This object is obtained by impregnating with carbon dioxide gas at pressures between the ranges of 50 to 300 pounds, 170 pounds being very satisfactory. It has been discovered that sufficient gas can be incorporated or dissolved in the rubber in an hour and a half period, or less, to cause blowing to this degree. It should be noted that it is possible to blow by this process, using the pressures hereinbefore mentioned to as much as 1000 or more per cent., but the particular requirements of commercial conditions are perhaps most easily met when expansion is limited from 450 to 600 per cent.

Another object is to provide a condition during impregnation or carbonation such that penetration of the uncured stock is facilitated. This object is accomplished by providing that the first hour of the usual hour and a half of impregnation time be at a temperature in the neighborhood of between 125 and 175 degrees F., the purpose being to soften or plasticize the rubber so that the penetration will be more effective. It has been found useful to cool the stock during the last half-hour of impregnation to a temperature of 100 degrees F. or below, better filling and better cell structure being obtained when this is done than when the higher temperature is maintained throughout. We have discovered that low temperature accelerators can be successfully used in conjunction with this process most advantageously, thereby achieving many improvements.

Another object of this invention is to provide a process of manufacturing sponge rubber through gas impregnation or carbonation, wherein the pressure required to effect it is relatively low and requires no unusual commercial equipment.

Another object is to provide compounds adapted to be vulcanized or cured at temperatures below those at which customary chemicals interact to form blowing ingredients.

Another object is to provide simple means whereby the uniformity of cell formation is under control.

Another object of this invention is to provide a method whereby objects of variable thickness or of relatively great thickness may be impregnated or carbonated without additional time being required.

Another object is to provide a process and method whereby objects having portions in a vertical plane, as well as in a horizontal plane, may be made with equal uniformity.

Another object is to produce a product made from crude rubber of a kind not hitherto made from this material.

In the drawings:

Figure 1 is a side elevation of a mold suitable for carrying out the process of this invention.

Figure 2 is a top plan view, partly broken away, of the mold shown in Figure 1.

Figure 3 is a vertical section through the mold of Figures 1 and 2, along the line 3—3 of Figure 2, showing the rubber batch prior to its impregnation and expansion.

Figure 4 is a view similar to Figure 3, but showing the rubber batch after its gas impregnation and expansion to fill the mold with sponge rubber.

Figure 5 is a vertical section through an autoclave suitable for carrying out the gas-impregnation and vulcanization steps, showing the mold of Figure 1 in position.

Figure 6 is a graph showing the relationship between the pressure of the impregnating gas, the temperature conditions and the percentage of expansion of the rubber product obtained in a modification of the process.

In general, the process of this invention consists in preparing a suitable rubber batch of materials known to those skilled in the rubber art, and suitable for sponge rubber, an example of such a batch being given later. This batch is then placed in a perforated or foraminated mold, the latter being placed within an autoclave and subjected to high pressure carbon dioxide gas. The gas penetrates the pores of the rubber and impregnates the interior with carbon dioxide under pressure, the process being accomplished or followed by the application of heat, along with the reduction of pressure of the gas. Under these conditions the rubber batch expands to fill the mold, due to the reduction in pressure, the application of heat and the presence of the high pressure gas within the cellular structure of the rubber. The expanded rubber thus becomes sponge rubber, and this is given a permanent form by the vulcanization which is carried out upon the expanded product.

Apparatus

Referring to the drawings in detail, Figures 1 to 4 show various views of a perforated or foraminated mold employed in the process of this invention. This mold may be of any suitable shape, according to the shape of the article to be produced. As shown in the drawings, the mold is in the shape of a rectangular block, with inserted portions adapted to provide a sponge rubber cushion-like article, with partitions therein. To this end the mold, generally designated 10, is provided with side walls 11 of perforated or foraminated material, such as punched metal plates or metal gauze, these side walls 11 being provided with outwardly extending flanges 12. A bottom plate 13 and a top plate 14 are provided for engaging the flanges 12 to provide a closed container. Sheets 15 of lining material are provided for the interior of the mold, these being preferably of fabric or of very fine gauze. The purpose of this lining material 15 is to permit the passage of gas and impede the passage of rubber therethrough. The top and bottom plates 14 and 13 may be clamped to the flanges 12 in any suitable manner, the means shown consisting of clamps 16 having knurled headed screws 17 for applying clamping pressure to the jaws thereof.

In the interior of the mold are arranged core portions 18, these also preferably having perforated walls to permit the passage of gas. As the rubber portions adjacent these cores are usually in the interior of the article, the slight projections caused by the extrusion of the rubber through the perforations will not ordinarily be objectionable, hence, a liner is not ordinarily used around the cores. It will be understood, however, that if a comparatively smooth wall is desired for the interior walls of the compartments formed by these cores, a suitable liner of fabric or gauze may be provided in a manner similar to the liner 15 employed in connection with the outer walls of the mold. In the embodiment shown in the drawings the side walls 11 and top and bottom plates 14 and 13 consist of metal sheets having small holes 19 drilled or punched therethrough.

For the gas impregnation and/or the vulcanization steps of the process, the apparatus shown in Figure 5 may be employed. This consists of an autoclave, generally designated 20, and having outer and inner walls 21 and 22, respectively, with a closed space 23 therebetween. Pipes 24 and 25, controlled by valves 26 and 27, serve for the admission or discharge of steam or other suitable heating agent, and also for the introduction of such cooling agents as may be desirable. The front of the autoclave 20 is closed by a door, generally designated 28, and having outer and inner walls 29 and 30, separated by the space 31, which is preferably also connected to the source of heating or cooling agent, in a manner similar to the space 23.

Clamping nuts 32 on the bolts 33, pivoted as at 34, to the outer walls of the autoclave, serve to clamp the door 28 securely to the remainder of the autoclave and to provide a gas-tight junction therebetween. The door 28 is provided with bosses 35 engaging corresponding projections 36 on the walls of the autoclave. These, in connection with the hinge pins 37, provide hinges upon which the door may be swung to and fro into its open or closed position.

Batch

The batch of rubber stock from which the sponge rubber is made may be of any suitable composition, the following composition having been found suitable for the production of rubber by the apparatus and process disclosed herein:

|  | Parts |
| --- | --- |
| Rubber plastic | 100.00 |
| Sulphur | 2.75 |
| Zinc oxide | 5.00 |
| Mercapto benzothiozole | .50 |
| Tetramethylthiuramdisulfide | .25 |
| Phenylbetanaphthylamine | 1.00 |
| Stearic acid | 1.00 |
| Petrolatum | 15.00 |
| Coloring agent (Dupont Rubber Green F. D.) | 2.00 |

This particular compound can be very satisfactory when cured 40 min. at 35 lbs. and 40 min. at 45 lbs. in an autoclave.

This stock is mixed and calendered, in the manner known to those skilled in the rubber art, the product being obtained in sheets or strips of suitable thickness, according to the nature of the article to be made. These strips are cut to approximate dimensions and a weighed amount of this stock is placed in the mold, such as the one previously described and shown in Figures 1 to 5. In the article shown by way of illustration, the stock consists preferably of relatively thin strips or slabs of the rubber batch. The thickness of these strips may be, for example, .085 of an inch for the production of a sponge rubber article one-half an inch thick, and .15 of an inch for sponge rubber of one inch thickness.

The pieces or strips are inserted in the mold, either flat or edgewise, cushions having leg portions or partitions being made by inserting strips of stock on edge engaging the flat portion of the cushion. The mold cores 18 serve to occupy the space between the partitions. In the drawings the cover or top portion 38 and the partition or leg portions 39 are shown in this edge-to-flat relationship.

The stock or batch described above is preferably characterized by the use of low temperature accelerators, which would be impracticable in the manufacture of sponge rubber produced by the use of gas generating substances in the batch because of the necessity of having to attain relatively high temperatures before the gas generating chemicals react to form the gas for expanding the rubber into cellular form.

*Process*

With the mold loaded with the batch or stock in the above-described manner, the top and bottom plates 14 and 13 are clamped in position, with the liners 15 in proper locations, and the entire assembly is then placed in the autoclave 20. The door 28 of the autoclave is then clamped tightly against the walls so that the mold occupies a gas-tight inclosure. The gas valve 40 in the pipe 41 leading into the interior of the autoclave through the passageway 42 is now opened to permit the entrance of high pressure carbon dioxide. The temperature in the interior of the autoclave is a suitable temperature, which is high enough to soften or plasticize the rubber so that the penetration will be more effective, yet not so high as to vulcanize the stock. Any temperature below 140 degrees F. may be employed, room temperature being preferable. The carbon dioxide gas is allowed to enter until its pressure reaches approximately 170 lbs. per square inch, although the upper or lower pressures may be used, according to the particular nature of the batch. The gas valve 40 is then closed and the pressure maintained for a suitable period of time. The exact time for the exposure of the batch to the gas also depends upon the nature of the batch and the pressure employed, a period of one hour to one and one-half hours being frequently used, at the previously mentioned pressure of 170 pounds per square inch.

The valves 26 and 27 are now opened and steam is admitted to the space 23 between the outer and inner walls 21 and 22 of the autoclave. Under the influence of this steam the temperature and pressure inside the autoclave rise to approximately 200 degrees F. and 235 pounds per square inch, respectively. The gas is then released slowly over a period of from fifteen to thirty minutes, the temperature rising as the gas makes its exit with a steam pressure of 30 to 35 pounds per square inch. The temperature within the autoclave is maintained at a maximum of from 260 to 265 degrees F. When the gas pressure drops to a pressure of from 5 to 15 pounds per square inch the gas valve 40 is closed. Under these conditions the rubber batch becomes impregnated with carbon dioxide gas, and this gas expands as the external gas pressure is lowered, thereby forming cells within the rubber and expanding the rubber itself to fill the mold, as shown by a comparison of Figures 3 and 4. The lower the residual gas pressure the larger are the cells formed in the sponge rubber. When the rubber has expanded to a suitable amount within the mold, the article is vulcanized and given its final cure by being treated for fifty minutes at a steam pressure of thirty pounds per square inch, and afterward for another fifty minutes at a steam pressure of 40 pounds per square inch, using a temperature of approximately 240 degrees F.

In Figure 6 is shown a graph giving the relationship between the gas pressure and temperature for a particular procedure. In this procedure the carbon dioxide gas is admitted until it reaches a pressure of 170 pounds per square inch, and the temperature is steadily raised, beginning at room temperature of approximately 75 degrees. The pressure and temperature rise concurrently, as shown in the graph, over a period of approximately 12 minutes until the gas reaches a pressure of about 235 pounds per square inch. The gas pressure is then released and allowed to fall rapidly between the times of 12 and 25 minutes, while the temperature is increasingly raised. The gas pressure subsides more slowly as the temperature nears its peak of approximately 240 degrees, and decreases to atmospheric pressure after a period of approximately 40 minutes. Meanwhile, the rubber article has expanded to approximately 1200 per cent. of its original volume, as shown by the third curve on the chart of Figure 6.

The point to which the pressure is released while vulcanization takes place in connection with the thickness of the batch inserted, determines the density of the rubber stock obtained. In releasing the pressure down to 5 pounds per square inch, for example, a substantial increase in expansion is obtained over that obtained when the release is only to 15 pounds per square inch. This control of the ultimate pressure enables the accurate control of the density and firmness of the rubber. For example, a sufficient amount of batch to completely fill the mold when the pressure is reduced to 5 pounds per square inch, frequently gives a stock which is very soft and flimsy, this being desirable for purposes such as cushions, but undesirable for other purposes, such as fillers where a greater density of stock or body is required. In the first instance the maximum expansion would be secured with the minimum amount of stock being used. In the second instance, however, more stock would be used, or an increase might be made in the thickness thereof, and by halting the release of the pressure at 15 pounds per square inch the exact filling would take place.

The temperatures given are approximate and may be varied as they represent thermometer temperatures. For instance, it is possible to have the temperature range from 205 degrees F. to 270 degrees F., depending upon the compound.

It will be understood that I desire to comprehend within my invention such modifications as come within the scope of the claims and the invention.

Having thus fully described my invention, what I claim as new and desire to secure by Letters Patent, is:

1. A process of making sponge rubber including the following steps: (a) the step of subjecting the rubber to heat at a sub-vulcanizing temperature sufficient to soften the rubber yet insufficient to vulcanize it and simultaneously impregnating the rubber with gas; (b) the step of subsequently reducing the pressure to cause the sponging of the rubber by expansion of the gas while continuing to elevate the temperature, whereby the gas is substantially released prior to the vulcanization of the rubber; and (c) the step of thereafter heating the rubber to a vulcanizing temperature to vulcanize the rubber in its sponged condition.

2. A process of making sponge rubber including the following steps: (a) the step of subjecting raw rubber stock to heat at a sub-vulcanizing temperature sufficient to soften the stock yet insufficient to vulcanize it while impregnating the rubber with substantially dry inert gas; (b) the step of subsequently reducing the pressure while continuing to elevate the temperature, whereby to bring about expansion of the rubber in sponge form prior to vulcanization; and (c) the step of thereafter releasing substantially all of the pressure prior to vulcanization and continuing the heating to complete the vulcanization of the rubber in its fully expanded sponge condition.

3. A process of making sponge rubber including the following steps: (a) the step of subjecting the rubber to heat at a temperature below a vulcanizing temperature not exceeding approximately 140 degrees F. and simultaneously impregnating the rubber with gas under a pressure not exceeding 170 pounds per square inch; (b) the step of subsequently increasing the temperature and pressure to approximately 200 degrees F. and 230 pounds per square inch, respectively; (c) the step of thereafter releasing substantially all of the pressure to cause the sponging of the rubber while continuing to elevate the temperature, whereby to bring about the maximum sponging of the rubber prior to the setting of the rubber consequent to vulcanization; and (d) the step of thereafter continuing to elevate the temperature to vulcanize the rubber.

4. A process of making sponge rubber including the following steps: (a) the step of subjecting the rubber to gas pressure to impregnate the rubber while applying heat thereto sufficient to raise the temperature yet to maintain the temperature below a vulcanization temperature; (b) the subsequent step of decreasing the pressure to cause the sponging of the rubber while increasing the temperature whereby to progressively sponge the rubber; and (c) the step of completing the sponging of the rubber by continuing to increase the temperature while releasing substantially all of the pressure substantially prior to the setting of the rubber by its becoming vulcanized.

HENRY R. MINOR.